United States Patent Office 3,485,027
Patented Dec. 23, 1969

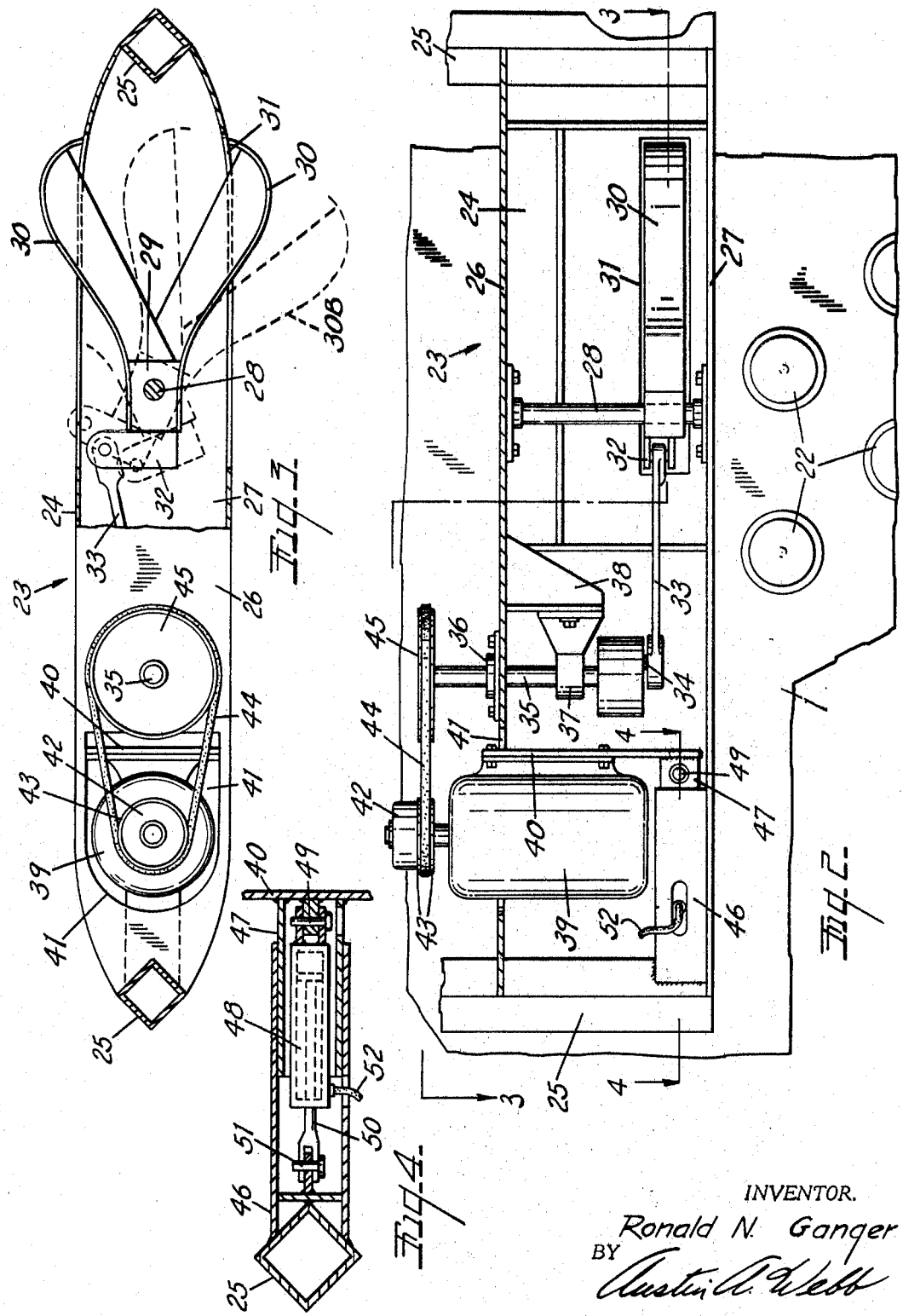

3,485,027
VIBRATORY HARVESTING MACHINE
Ronald N. Ganger, Dowagiac, Mich., assignor to Blueberry Equipment, Inc., South Haven, Mich.
Filed Jan. 18, 1968, Ser. No. 698,895
Int. Cl. A01g *19/00*
U.S. Cl. 56—330                                    10 Claims

ABSTRACT OF THE DISCLOSURE

A self propelled row crop straddling machine with bush shaking elements projecting inwardly from opposite sides, an elongated double sided plow hanging from the top of the machine and between its sides to pass through the center of the row, a double sided shaker bar oscillatably mounted in the plow with arms projectable from opposite sides of the plow, a motor driven eccentric within the plow, a connecting rod drivingly connecting the eccentric and the shaker bar, and remotely controllable means for varying the speed of the eccentric.

OUTLINE OF INVENTION

Straddle type, bush shaking machines for applying bush shaking vibrators to the opposite sides of rows of bushes are well known. The machines include collecting plates and belts that collect the fruit or other crop shaken from the bushes. The present invention provides a longitudinally elongated, plow-like, housing in depending relation in the middle of a row straddling machine to plow through the centers of the bushes in the row, from the top, without damage to the bushes. A double sided shaker bar is pivotally mounted between the sides of the plow and has shaker arms that are oscillated oppositely outwardly from opposite sides of the plow to engage the shake branches of the bushes that would not be directly engaged and shaken by the vibrators on the sides of the machine. A motor for oscillating the shaker bar is mounted in the plow; and means for adjusting the drive ratio between the motor and the bar, to vary the vibratory frequency of the bar, is incorporated in the drive connection between the motor and the bar. The adjusting mechanism is selectively and remotely controllable, so that the shaker bar frequency can be adjusted while the machine is in operation.

The drawings of which there are two sheets illustrate a preferred form of the center vibrating mechanism of the invention applied to a self propelled row straddling harvesting machine of the shaker type.

FIGURE 2 is a fragmentary vertical longitudinal cross sectional view taken along the plane of the line 2—2 in FIGURE 1.

FIGURE 3 is a fragmentary horizontal cross sectional view taken along the plane of broken line 3—3 in FIGURE 2.

FIGURE 4 is a fragmentary enlarged cross sectional view taken along the plane of the line 4—4 in FIGURE 2.

Figure 1:
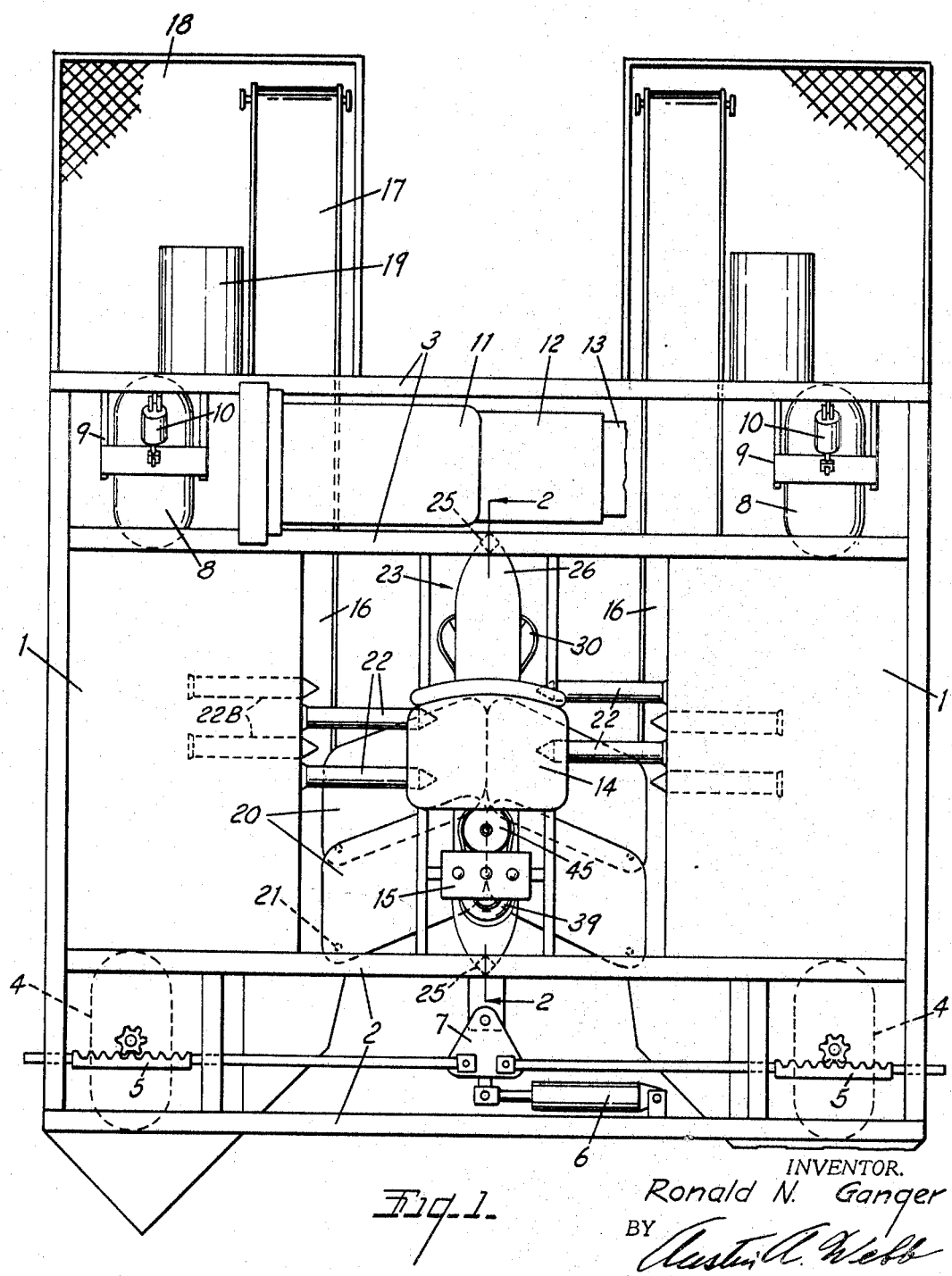
FIGURE 1 is a fragmentary top plan view of the harvesting machine.

The harvesting machine comprises a suitable carriage having spaced side housings 1 with an elevated framework including front cross members 2 at the front of the housings and rear cross members 3 at the rear of the housings. The framework is supported by front wheels 4 which are steerable by means of the racks 5 actuated by the hydraulic cylinder 6 which controls the position of the triangular center steering plate 7. Rear wheels 8 are supported by yokes 9 and the yokes are vertically adjustable by means of the hydraulic cylinders 10. The rear cross members 3 support an internal combustion engine conventionally illustrated at 11 and the engine is connected to drive a generator 12 and a hydraulic pump 13. An operators seat 14 is supported between the front and rear cross members adjacent to a control box 15 having controls for regulating the electrically hydraulically actuated parts of the machine.

Positioned at a lower level of the framework and along the inner sides of the side housings 1 are a pair of collector belts 16 which extend rearwardly to upwardly inclined portions 17 located over loading platforms 18 at the rear of the machine. Blowers shown conventionally at 19 are arranged to blow leaves and trash off of the belts before the belts deliver the harvested crop to receiving boxes which may be removably positioned on the platforms 18.

Projecting inwardly from the inner sides of the belts 16 are pivoting collecting plates 20 which are arranged in overlapping relation to catch the berries or crop pieces shaken from the bushes and deliver them to the belts 17. The plates 20 swing rearwardly and outwardly about the pivots 21 when engaging and passing the stalks or trunks of the bushes or vines.

The side housings 1 support shaker fingers 22 which are orbitally driven at high speeds and horizontally reciprocable between the full line positions 22 and the dotted line positions 22B shown to penetrate the sides of the bushes or vines of a row crop to impart shaking motion to the vines and shake ripe fruit or other crops from the plants.

The center plow shaker which constitute the present invention is indicated generally by the numeral 23 and constitutes an elongated housing having side walls 24 tapering at the front and rear to upright supporting posts 25 depending from the front cross member 2 and the rear cross member 3. The housing is thus supported in the center of the machine above the side vibrating elements 22.

The side plates 24 are connected by a top plate 26 and a bottom plate 27 which form supports for a pivot shaft 28 located generally over the side shaker or vibrator elements 22. Oscillatably mounted on the pivot shaft 28 is a center shaker bar 29 having laterally divergent shaker arms 30 that extend in rearwardly curved fashion and project through slots 31 provided in the side plates 24. A crank arm 32 connected to the forward end of the shaker bar is connected by a connecting rod 33 to an eccentric pin 34 on the lower end of a countershaft 35. The countershaft is supported by a bearing 36 mounted on the top plate 26 and a lower bearing 37 supported by suitable bracket 38. An electric motor 39 is mounted on an upright motor support plate 40 and the upper end of the motor and the support plate project through an opening 41 in the top plate 26 of the plow housing.

A pulley 42 having variably spaced spring pressed plates 43 is connected to the shaft of the motor and drives the belt 44 which extends in driving engagement with the pulley 45 on the countershaft 35. It will be apparent that rotation of the countershaft by the motor 39 causes the bush contacting side arms 30 of the shaker to oscillate alternately outwardly from opposite sides of the center plow 23 as indicated by the dotted lines 30B in FIGURE 3.

In order to permit variation of the frequency of oscillation of the shaker arms 30 to obtain optimum shaking action on the upper center branches of the bushes, the motor support plate 40 is adjustably mounted in the housing of the plow. As is more particularly shown in FIGURES 2 and 4 a tubular rectangular bar 46 is secured to the bottom plate 27 behind the front support post 25 to constitute a slideway having a smaller inner slide of tubular rectangular cross section indicated at 47. The motor support plate 40 is secured to the rear end of the slide 47. Positioned within the tubular slide and slideway is a hydraulic cylinder 48 having its rear end connected at 49 to the support plate 40. A piston rod 50 projecting from the forward end of the cylinder is connected at 51 to a suitable anchor in the forward end of the slide forming cylinder. A hydraulic connection indicated conventionally at 52 is extended to the control 15 that adjusts the position of the motor 39 against the spring pressure of the variable speed pulley 42 to vary the diameter of the pulley and the drive ratio between the plate 43 and the pulley 45. No attempt has been made to illustrate the details of the connection between the connection 52 from the cylinder through the control 15 as such connections can be made by persons skilled in the art.

It is contemplated that the center shaker bar may be operated either alone or in conjunction with the side shaker elements 22 or vice versa and this selective operation of the double side center shaker bar can be easily controlled from the control box 15 by selective energization of the motor 39 and the drive means for the side shaker elements 22.

What is claimed as new is:

1. A straddle type harvesting machine for row crops having a mobile carriage with upright sides connected by an elevated cross member adapted to straddle a crop row comprising,
   an elongated plow element supported in longitudinally extending depending relation from said cross member,
   spaced sides on said plow element joined together in a tapered point at the front,
   a shaker bar mounted on an upright pivot between the sides of said plow element and having divergent side arms projectable through slots provided therefor in the sides of the plow,
   a motor mounted in said plow element,
   and means connecting said motor to said shaker bar to oscillate the bar.

2. A harvesting machine as defined in claim 1 in which said means connecting said motor to said shaker bar are adjustable to vary the frequency of oscillation of said shaker bar.

3. A harvesting machine as defined in claim 1 in which said means connecting said motor to said shaker bar comprise an upright countershaft mounted in said plow element and having an eccentric crank pin,
   a crank arm on said shaker bar connected to said crank pin by a connecting rod,
   and means drivingly connecting said motor to said countershaft.

4. A harvesting machine as defined in claim 3 in which said means connecting said motor to said countershaft comprises pulleys connected to said motor and said countershaft and connected by a belt,
   one of said pulleys being a variable diameter pulley,
   and an adjustable support for said motor on said plow element arranged to vary the distance between said pulleys.

5. A harvesting machine as defined in claim 4 in which the adjustable support for said motor is remotely adjustable.

6. A harvesting machine as defined in claim 5 in which the remote adjustment for said support comprises
   a fixed slideway on said plow element,
   a slide movable on said slideway,
   a plate connected to said slide and having said motor mounted thereon,
   a hydraulic cylinder and piston connected between said slide and said slideway, an operator's position located on said carriage,
   and hydraulic control means for said cylinder adjacent said operator's position of said machine.

7. A harvesting machine as defined in claim 6 in which said slideway is a fixed tube of rectangular cross section, and said slide is a tube of smaller rectangular cross section reciprocable in said first tube,
   said cylinder and piston being connected to said tubes,
   and hydraulic connections extending from opposite ends of said cylinder to said control means.

8. A harvesting machine as defined in claim 4 in which said arms on said shaker bar are divergent rearwardly from said countershaft, and are of outwardly and rearwardly rounded shape.

9. A harvesting machine as defined in claim 1 in which there are vibratory shaker elements projecting transversely inwardly from the upright sides of the machine at a lower level than said plow element.

10. A harvesting machine as defined in claim 2 in which there are vibratory shaker elements projecting transversely inwardly from the upright sides of the machine at a lower level than said plow element.

References Cited

UNITED STATES PATENTS

| | | | |
|---|---|---|---|
| 3,328,944 | 7/1967 | Shepardson | 56—331 |
| 3,396,521 | 8/1968 | McKibben et al. | 56—330 |
| 3,425,202 | 2/1969 | Setzer | 56—328 |

E. BARRY SHAY, Primary Examiner

P. A. RAZZANO, Assistant Examiner